United States Patent [19]

Nakamura

[11] Patent Number: 5,301,175
[45] Date of Patent: Apr. 5, 1994

[54] OPTICAL HEAD APPARATUS FOR MAINTAINING A CONSTANT ANGLE BETWEEN AN OPTICAL AXIS OF AN OBJECT LENS AND THE SURFACE OF A STORAGE MEDIUM

[75] Inventor: Yuichi Nakamura, Tokyo, Japan

[73] Assignee: Kabushiki Kaisha Toshiba, Kawasaki, Japan

[21] Appl. No.: 897,480

[22] Filed: Jun. 12, 1992

[30] Foreign Application Priority Data

Jun. 14, 1991 [JP] Japan .................................. 3-143378

[51] Int. Cl.⁵ ................................................ G11B 7/00
[52] U.S. Cl. .............................. 369/44.32; 369/44.15; 369/44.22
[58] Field of Search .... 369/44.11, 44.14, 44.15–44.22, 369/44.32; 359/813, 814, 823, 824

[56] References Cited

U.S. PATENT DOCUMENTS

| | | | |
|---|---|---|---|
| 4,661,943 | 4/1987 | Ikeda | 369/44.32 |
| 4,674,078 | 6/1987 | Otsuka et al. | 369/44.32 |
| 4,942,562 | 7/1990 | Suzuki | 369/44.11 |
| 5,056,075 | 10/1991 | Murata et al. | 369/44.32 |
| 5,182,739 | 1/1993 | Kime et al. | 369/44.15 |

Primary Examiner—Aristotelis Psitos
Assistant Examiner—Thang V. Tran
Attorney, Agent, or Firm—Cushman, Darby & Cushman

[57] ABSTRACT

An optical head apparatus contains two pairs of coils. These coils are paired off in one of a first direction and second direction perpendicular to the first direction and are energized independently of one another. They drive an object lens along its optical axis, while simultaneously allowing the optical axis and the recording surface of a disk to form an angle of 90°.

9 Claims, 7 Drawing Sheets

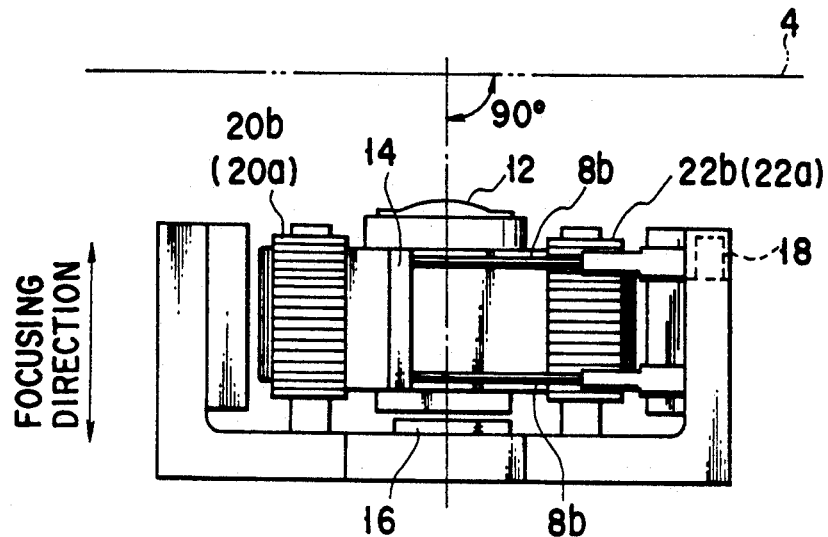
F I G. 4A
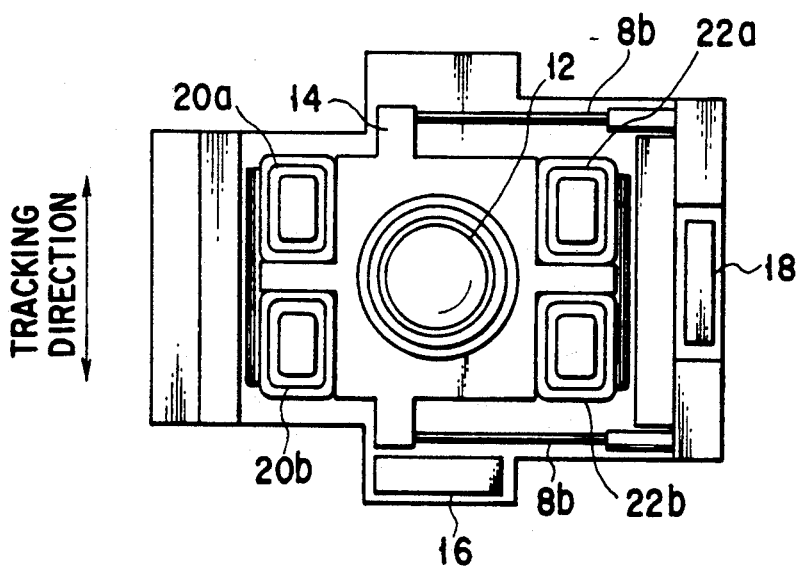
F I G. 4B

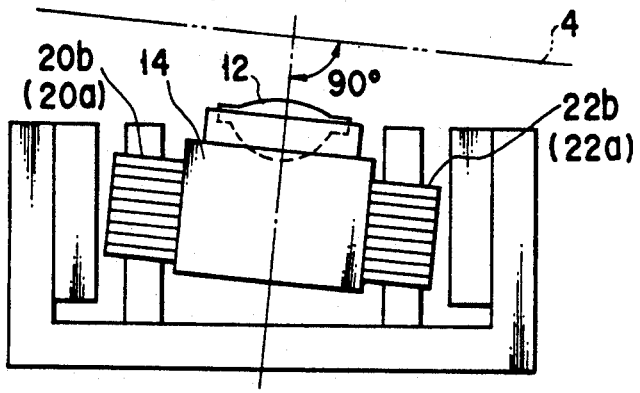
F I G. 6A
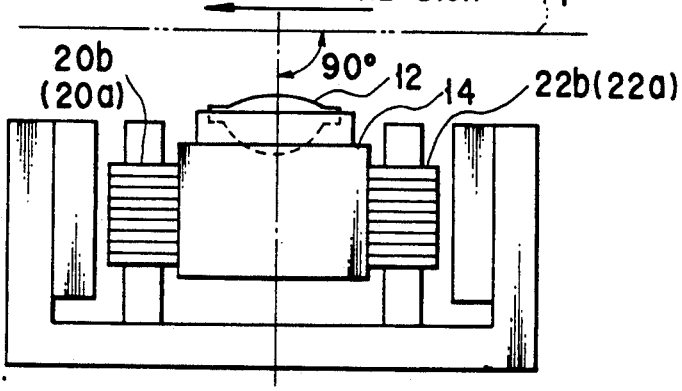
F I G. 6B
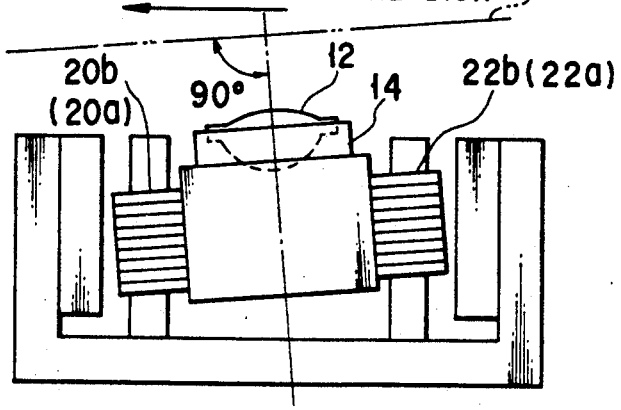
F I G. 6C

OPTICAL HEAD APPARATUS FOR MAINTAINING A CONSTANT ANGLE BETWEEN AN OPTICAL AXIS OF AN OBJECT LENS AND THE SURFACE OF A STORAGE MEDIUM

BACKGROUND OF THE INVENTION

Field of the Invention

The present invention relates to a system for reproducing information recorded on an optical disk, and more particularly to an object lens-moving mechanism which is employed in the system and capable of driving an object lens such that a light beam from the object lens is incident on a recording surface of the optical disk at right angles thereto even when the recording surface tilts.

Description of the Related Art

In general, in a system for reproducing information recorded on an optical disk, i.e., an optical disk apparatus, the information is reproduced by means of an optical head device and a reproducing circuit.

The optical head device includes an object lens for irradiating the optical disk with a light beam, a light source for producing the light beam, and an optical detector for detecting the light component used for the reproduction of information from the light beam reflected by the disk.

The optical head device is so designed as to permit the light beam directed to the disk to be incident on the recording surface of the disk at right angles. However, where the optical disk has a large diameter, it is generally known that the periphery of the disk bends downward due to the weight of the disk. If the periphery of the optical disk bends downward, the light beam is not incident on the recording surface at right angles. In other words, the angle between the recording surface of the optical disk and a ray axis of the light beam is other than 90°.

In the case where the ray axis of the light beam incident on the optical disk does not form 90° with reference to the recording surface, the light beam reflected by the disk contains increased coma distortion, and the level of the signal detected by the optical detector is low, accordingly. As a result, a cross-talk or an off-set increases in the signal detected by the detector, and an error is likely to occur in the focus control (focusing) or track control (tracking). To be more specific, the recording surface and the light beam to be focused on the recording surface may not be maintained in the just-in-focus state, or the tracks of the recording surface and the light beam may not be maintained in the just-on-track state.

In consideration of the above, many methods or mechanisms have hitherto been proposed, so as to maintain the angle between the ray axis and the recording surface constantly at 90°. For example, according to the method or mechanism of Published Unexamined Japanese Patent Application No. 63-25841, the whole of an optical head device is inclined or declined in accordance with the curve of the recording surface, and the curve of the recording surface is detected, thereby permitting the ray axis to be constantly perpendicular to the recording surface.

However, where the whole of the optical head device is inclined or declined, it is necessary to employ a head-tilting mechanism which is complex in structure and large in size. It is also necessary to employ a driving mechanism (e.g., a motor) so as to drive the head-tilting mechanism. Accordingly, not only the manufacturing cost of the head-tilting mechanism is high, but also the seek speed of the head is low (i.e., the access time is long) due to an increase in the inertia load of the head and the head-tilting mechanism.

It should be noted that the optical disk may not only bend or curve in the radial direction but also may wave in the tangential direction. The "tangential direction" is a direction which corresponds to the tangential line of the tracks of the disk, and which the direction perpendicular to the radial direction in the recording surface of the disk. Hence, the head-tilting mechanism is inevitably very complex in structure and has an increased inertia load. If the head-tilting mechanism is designed to tilt the head not only in the radial direction of the disk but also in the tangential direction thereof, the inertia load of the mechanism is considerably increases, and the structure thereof is considerably complex. In practice, the optical head used together with such a head-tilting mechanism may not fulfill its function.

SUMMARY OF THE INVENTION

The present invention has been developed in consideration of the above problems, and an object of the present invention is to provide an object lens-moving mechanism enabling the optical axis of an object lens to be tilted in a desirable direction.

Another object of the present invention is to provide an optical head device which enables the angle between the ray axis of a light beam and a recording surface of an optical disk to be constantly maintained at 90° even if the recording surface of the optical disk bends or curves in any direction.

Still another object of the present invention is to provide an information reproducing system capable of reproducing information recorded on an optical disk without an error.

According to the present invention, there is provided an optical head apparatus comprising: an optical element, having an optical axis, for focusing a light beam onto the surface of an object; means for holding the optical element; means for supporting the holding means and capable of moving the holding means in a desirable direction; and driving means, integral with the holding means, for driving the holding means along the optical axis while simultaneously maintaining a state where the optical axis and the surface of the object form an angle of 90°.

According to the present invention, there is also provided a system for reproducing information recorded on an optical disk, comprising: a light source for generating a light beam; an optical element, having an optical axis, for focusing the light beam generated by the light source onto a recording track formed on a recording surface of the optical disk; means for holding the optical element, the holding means including a plurality of coil elements which are arranged on two axes, perpendicular to each other, disposed in a plane perpendicular to the optical axis, the coil elements being capable of producing a propelling force in a direction which is parallel to a plane containing the optical axis; means for supporting the holding means such that the holding means is movable in a desirable direction; means for energizing the coil elements of the holding means; means for detecting whether or not the recording surface and the optical axis form an angle of 90°; and means, actuated when the angle detected by the detecting means is other than 90°, for controlling the energizing means so as to maintain the angle between the recording surface and the optical axis at 90°.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4A is a side view showing the object lens depicted in FIGS. 1-3, with the focusing direction indicated;

FIG. 4B is a schematic plan view showing the object lens depicted in FIG. 4A, with the tracking direction indicated;

FIGS. 6A-6C are schematic views showing how the object lens is tilted in the tangential direction.

DETAILED DESCRIPTION OF THE PREFERRED EMBODIMENTS

An embodiment of the present invention will now be described, with reference to the accompanying drawings.

Figure 1:
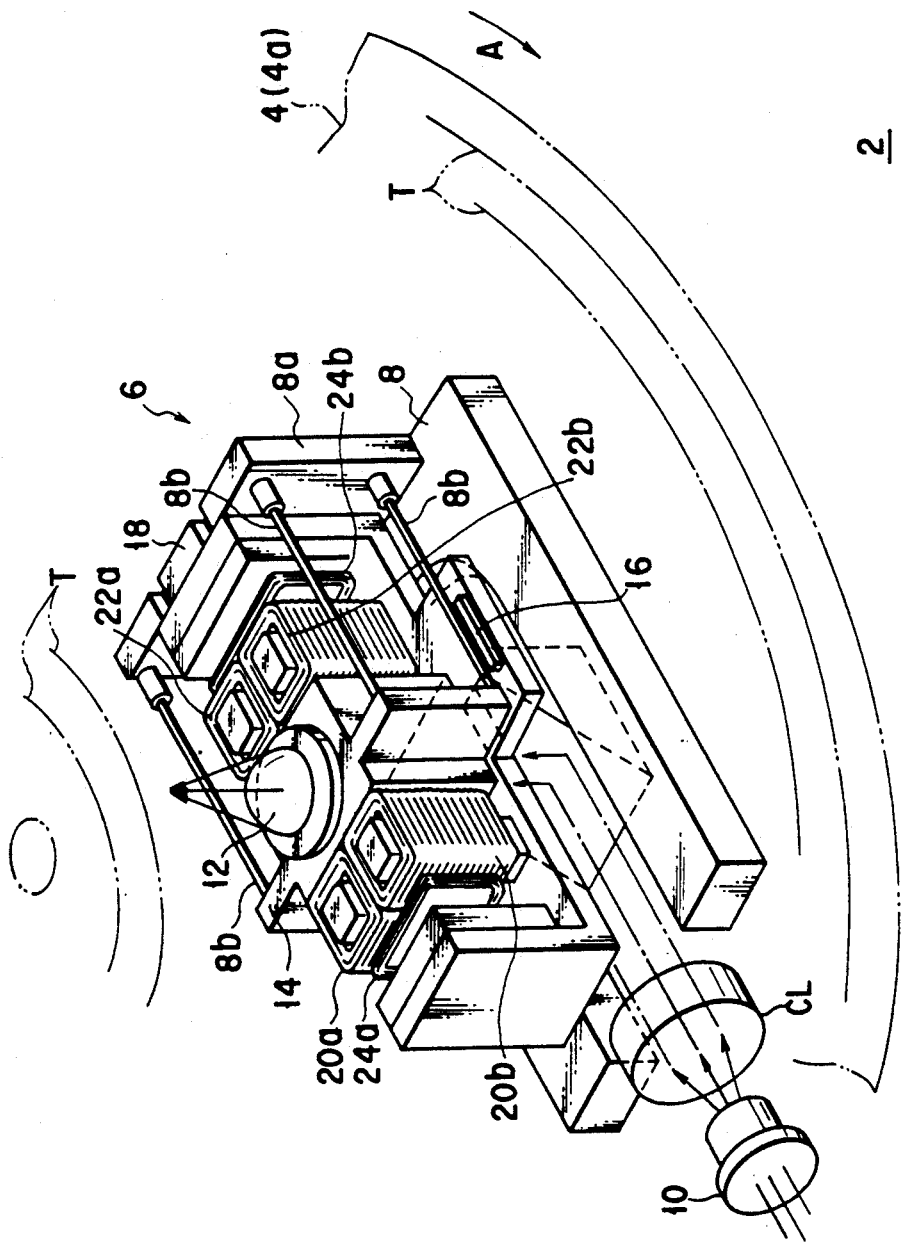
FIG. 1 is a schematic view showing the optical head of an optical disk apparatus according to an embodiment of the present invention.
Figure 2A:
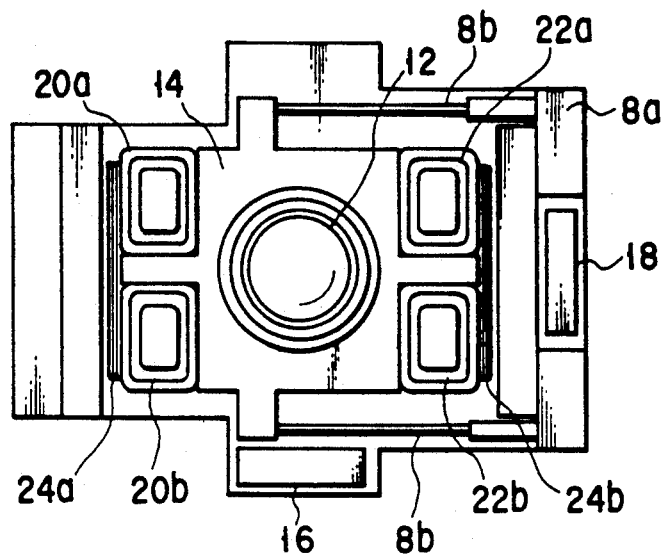
FIG. 2A is a schematic plan view of the optical head depicted in FIG. 1.
Figure 2B:
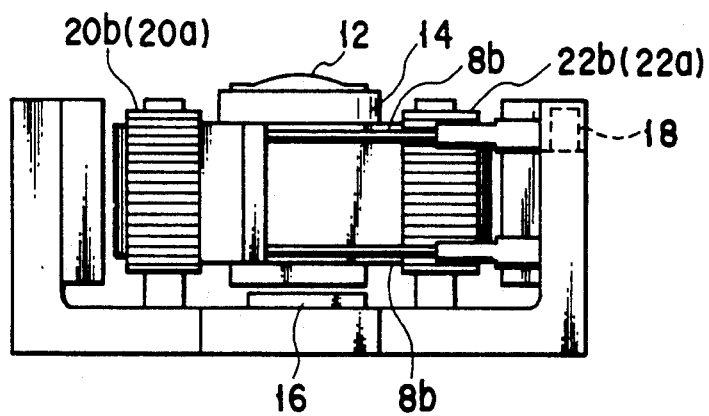
FIG. 2B is a side view of the optical head depicted in FIG. 1.

FIGS. 1, 2A and 2B show an optical disk apparatus 2 which incorporates an object lens-moving mechanism of the present invention.

The optical disk apparatus 2 includes an optical disk (i.e., a recording medium) 4 on which binary information is recorded; and an optical head 6 which records information on the recording surface 4a of the optical disk 4 or reads the information therefrom.

The optical disk 4 is removable from the apparatus 2, so that information can be recorded or read from a desired optical disk. In the apparatus 2, the disk 4 is rotated by means of a motor (not shown) in such a manner that the linear velocity of the tracks T formed on the recording surface 4a of the disk is constant. The disk 4 is rotated, for example in the direction indicated by the arrow A in FIG. 1.

The optical head 6 has: a semiconductor laser element (i.e., a light source) 10 for generating a laser beam used for writing/reading information with reference to the recording surface 4a of the optical disk 4; and a base plate 8 having a large hole or cutout (not shown) through which the laser beam generated by the laser element 10 is directed to the optical disk 4. The base plate 8 can be moved in the radial direction of the disk 4 (i.e., the direction crossing the tracks T at right angles) by means of a linear motor (not shown).

The base plate 8 has a vertical side wall 8a, and wire springs 8b connected to the vertical side wall 8a. By means of the vertical side wall 8a and wire springs 8b, a lens mount member 14 is supported in a suspended state such that it is movable in a desired direction. The lens mount member 14 holds an object lens 12 by which the laser beam directed to the disk 4 through the large hole is focused on the recording surface 4a. At least two angular detector units 16 and 18 are arranged on the base plate 8. The angular detector units 16 and 18 detect the angle formed by the optical axis of the object lens 12 and the recording surface 4a of the disk 4. Each of the detector units 16 and 18 is typically a device which has a reference light source (e.g., an LED) located in the center thereof and at least two photodetectors arranged symmetric to each other around the reference light source. Each of the detector units 16 and 18 is positioned such that its photodetectors are in parallel to the radial direction of the disk (see FIG. 4C) and the tangential direction of the disk (see FIG. 4D). The reference light emitted by the reference light source is directed to the disk 4, and the light reflected from the disk 4 is detected by the photodetectors, thereby monitoring the angle formed by the optical axis of the object lens 12 and the recording surface 4a of the disk 4. Outputs of the detector units 16 and 18 are first amplified by differential amplifiers 34c and 34d (to be explained later) and then converted into difference signals. The difference signals are defined as zero where the angle between the optical axis of the object lens 12 and the recording surface 4a of the disk 4 is 90°. Two pairs of focusing coils 20a, 20b, 22a and 22b, and one pair of tracking coils 24a and 24b are arranged in the vicinity of the lens mount member 14.

The focusing coils 20a, 20b, 22a and 22b and the tracking coils 24a and 24b can move the suspended lens mount member 14 in the direction perpendicular to the recording surface 4a of the disk 4 and in the direction parallel to the recording surface 4a. The focusing coils employed in a general optical disk apparatus merely move a lens mount member only in the direction perpendicular to the recording surface of a optical disk. However, since two pairs of focusing coils are employed in the subject optical disk apparatus, they can move the lens mount member 14 not only in the direction perpendicular to the recording surface 4a but also in any other direction desired. Where the currents supplied to focusing coils 20a, 20b, 22a and 22b are the same in polarity, the lens mount member 14 rises or falls in the direction perpendicular to the recording surface 4a. Where the current supplied to focusing coils 20a and 20b and the current supplied to focusing coils 22a and 22b are opposite in polarity, the lens mount member 14 rises or falls while being inclined in the tangential direction indicated in FIG. 4C. The "tangential direction" is a direction which corresponds to the tangential line of the tracks of the disk, and which the direction perpendicular to the radial direction in the recording surface of the disk. Where the current supplied to focusing coils 20*a* and 22*a* and the current supplied to focusing coils 20*b* and 22*b* are opposite in polarity, the lens mount member 14 rises or falls while being inclined in the radial direction indicated in FIG. 4D.

Figure 3:
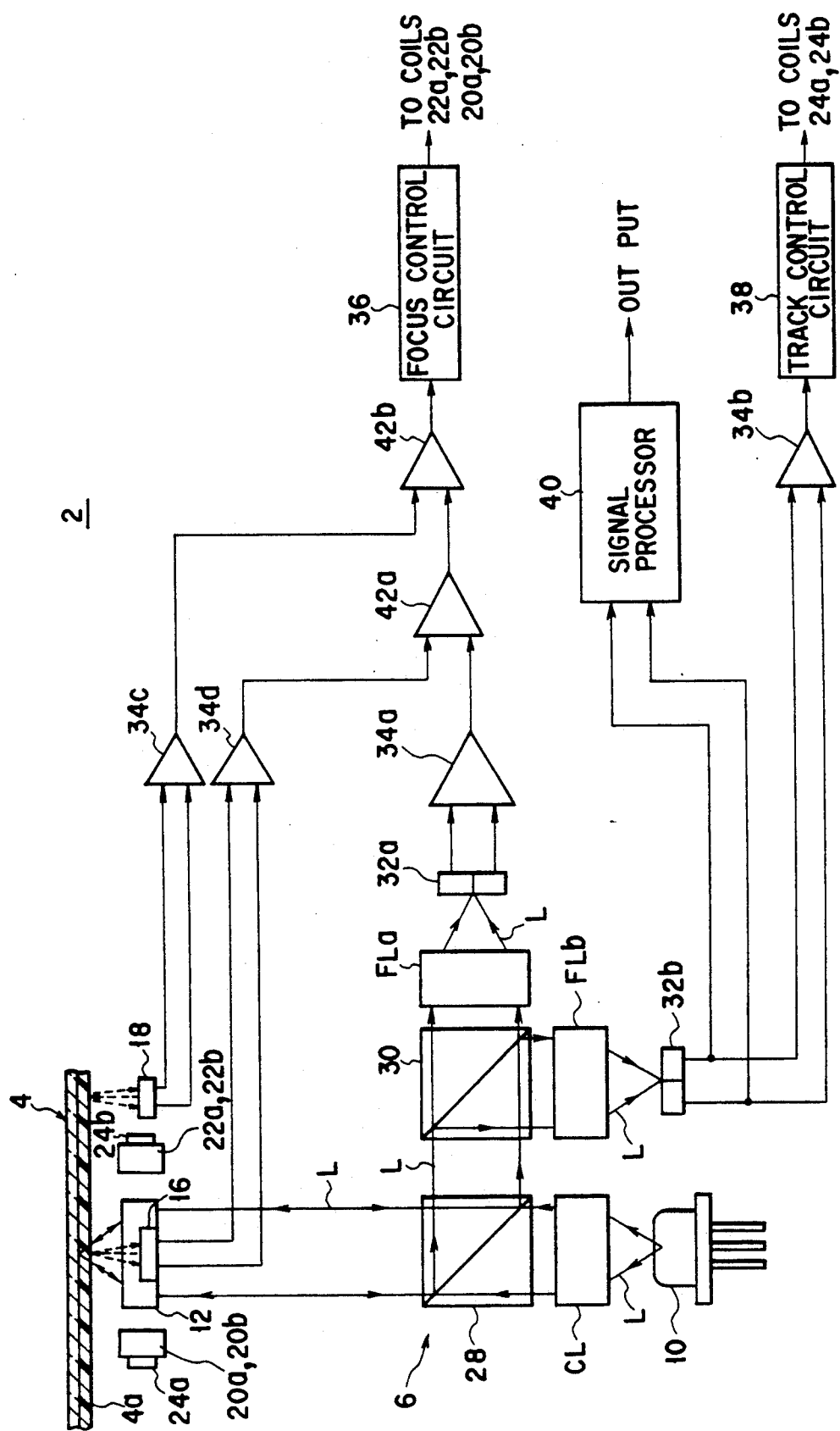
FIG. 3 is a diagram showing an optical disk apparatus which incorporates the optical head depicted in FIGS. 1, 2A and 2B.

Referring to FIG. 3, a collimating lens CL and a beam splitter 28 are arranged between the semiconductor laser element 10 and the object lens 12. The collimating lens CL converts the laser beam L generated by the laser element 10 into a parallel beam, and the beam splitter 28 separates the beam directed to the disk 4 from the beam returned by the disk 4. A secondary beam splitter 30 is located on one side of the beam splitter 28 (i.e., in the region to which the beam emerging from the beam splitter 28 is directed). The secondary beam splitter 30 has first and second beam output faces, and divides laser beam L (which is directed thereto by the beam splitter 28) into two light beams.

Photodetectors 32*a* and 32*b* are located on the two beam output sides of the secondary beam splitter 30, respectively, so as to detect the two beams obtained by the secondary beam splitter 30 and use the detected beams for the focus control and track control (which are to be mentioned later). A converging lens FLa is arranged between photodetector 32*a* and one beam output face of the secondary beam splitter 30, so as to converge the beam emerging from beam splitter 30 on photodetector 32*a*. Likewise, a converging lens FLb is arranged between photodetector 32*b* and the other beam output face of the secondary beam splitter 30, so as to converge the beam emerging from beam splitter 30 on photodetector 32*b*.

Photodetector 32*a* has a plurality of divided detection regions (not shown), by which signals used for focus control are output so as to maintain the distance between the recording surface 4*a* of the optical disk 4 and the object lens 12 in the just-in-focus state.

Photodetector 32*b* also has a plurality of divided detection regions (not shown), by which signals used for track control are output so as to maintain the tracks of the recording surface 4*a* and the object lens 12 in the just-on-track state.

Photodetectors 32*a* and 32*b* are connected to differential amplifiers 34*a* and 34*b*, respectively. The amplifiers 34*a* and 34*b* derive difference signals from the signals output from the detection regions of photodetectors 32*a* and 32*b* and amplify the difference signals. Differential amplifier 34*a* is connected to a focus control circuit 36 which produces a focusing signal used in the focus control, while differential amplifier 34*b* is connected to a track control circuit 38 which produces a tracking signal used in the track control. One of photodetectors 32*a* and 32*b* is connected to a signal processor 40 by which the information recorded on the disk 4 is produced. (Both photodetectors 32*a* and 32*b* may be connected to the signal processor 40, if so desired.)

Differential amplifiers 34*c* and 34*d* and adders 42*a* and 42*b* are inserted between differential amplifier 34*a* and focus control circuit 36. The differential amplifiers 34*c* and 34*d* produce difference signals on the basis of the outputs of the angular detector units 16 and 18 and amplify the difference signals. The adders 42*a* and 42*b* add outputs of differential amplifiers 34*c* and 34*d* to an output of differential amplifier 34*a* according to predetermined rules.

Figure 4C:
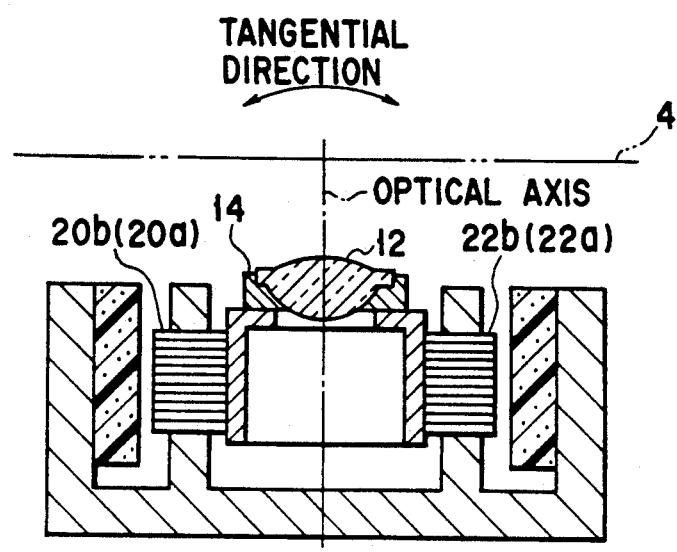
FIG. 4C is a schematic view showing the object lens depicted in FIG. 4A, with the tangential direction indicated.
Figure 4D:
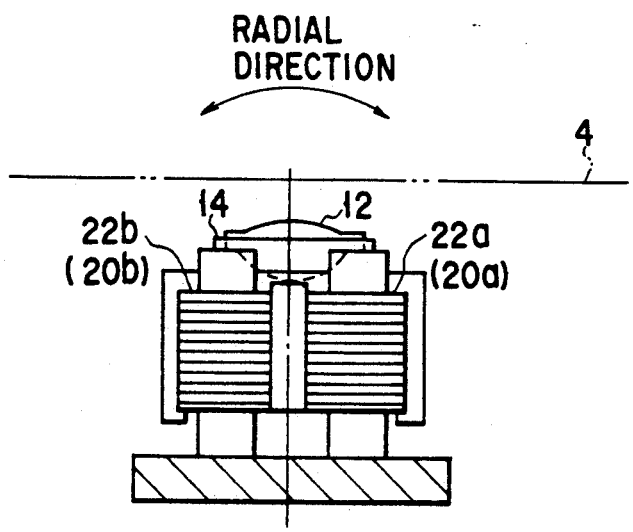
FIG. 4D is a schematic view showing the object lens depicted in FIG. 4A, with the radial direction indicated.

FIGS. 4A–4D show the four directions in which the object lens (or the lens mount member) can be moved by the focusing coils 20*a*, 20*b*, 22*a* and 22*b* and the tracking coils 24*a* and 24*b*. In FIG. 4A, the focusing direction (i.e., the focus control direction) is indicated. The focusing direction is perpendicular to the recording surface 4*a* of the disk 4. In FIG. 4B, the tracking direction (i.e., the track control direction) is indicated. The tracking direction is perpendicular to the focusing direction indicated in FIG. 4A. In FIG. 4C, the radial direction is indicated. The radial direction is a direction in which the object lens is moved from the center of the disk 4 to the periphery thereof. In FIG. 4D, the tangential direction is indicated. The tangential direction is perpendicular to the radial direction different from the focus control direction.

A description will now be given of the operation of the optical disk apparatus 2.

The divergent laser beam L generated by the semiconductor laser element 10 is collimated by the collimating lens CL and guided to the beam splitter 28. The laser beam passing through the beam splitter 28 is converged by the object lens 12 and focused on the recording surface 4*a* of the disk 4. The laser beam L reflected by the recording surface 4*a* passes through the object lens 12. After being collimated by the object lens 12, the laser beam L is guided again to the beam splitter 28.

The laser beam L guided again to the beam splitter 28 is reflected 90°, and is therefore incident on the secondary beam splitter 30. By this beam splitter 30, the laser beam L is divided into two beams, one being guided to photodetector 32*a* by way of converging lens FLa and the other being guided to photodetector 32*b* by way of converging lens FLb.

The laser beam L guided to photodetector 32*a* forms at least one of beam spots on the detection regions of photodetector 32*a*. Each of the beam spots formed on the detection regions has different area and represent a change in the distance between the disk 4 and the object lens 12. Focus detecting signals output from the detection regions of photodetector 32*a* are added together by amplifier 34*a*, thereby obtaining a focus error signal to be supplied to the focus control circuit 36. On the basis of the focus error signal, the focus control circuit 36 produces a focus control signal which defines the magnitude and polarity of currents used for energizing focusing coils 20*a*, 20*b*, 22*a* and 22*b*. The focus control signal is simultaneously supplied to coils 20*a*, 20*b*, 22*a* and 22*b*, thereby permitting the lens 12 (i.e., the lens mount member 14) to rise or fall in accordance with the magnitude and polarity of currents.

The laser beam L guided to photodetector 32*b* forms a track shadow (not shown) on the detection regions of photodetector 32*b*. The track shadow is projected in accordance with both the position of the track and the position of the object lens 12. In accordance with the position of the track shadow, a difference is produced among the areas of the beam spots formed on the detection regions of photodetector 32. Track detecting signals are added together by amplifier 34*b*, thereby obtaining a track error signal to be supplied to the track control circuit 38. On the basis of the track error signal, the track control circuit 38 produces a track control signal which defines the magnitude and polarity of currents used for energizing tracking coils 24*a* and 24*b*. The track control signal is simultaneously supplied to coils 24*a* and 24*b*, thereby permitting the lens 12 (i.e., the lens mount member 14) to move in the radial direction of the disk 4 in accordance with the magnitude and polarity of currents.

The laser beam L guided to photodetector 32b is also used for reproducing the information recorded on the disk 4. To be more specific, the signals output from photodetector 32b are supplied not only to amplifier 34b but also to the signal processor 40. The signal processor 40 calculates the sum of the output signals of photodetector 32b and converts the sum into binary data in accordance with the predetermined threshold level. The binary data, thus obtained, is supplied to an outputting device (not shown).

In the present invention, the optical head 6 incorporates two pairs of focusing coils 20a and 20b, 22a and 22b. With this structure, the direction in which the lens mount member 14 can rise or fall is not limited to the direction perpendicular to the recording surface 4a of the disk 4. In other words, the lens mount member 14 (i.e., the object lens 12) can be moved in any other direction by supplying coils 20a and 20b with a different current from that supplied to coils 22a and 22b or by supplying coils 20a and 22a with a different current from that supplied to coils 20b and 22b. With the coils 20a, 20b, 22a and 22b energized in this manner, the optical axis penetrating the lens mount member 14 can form any desirable angle with reference to the recording surface of the disk 4. Accordingly, even if the optical disk 4 curves, waves, vibrates or is deformed, and the optical axis of the object lens 12 does not form an angle of 90° with reference to the recording surface 4a of the disk 4, the laser beam L emerging from the object lens 12 can be made to fall on the recording surface at right angles thereto.

The angle between the optical axis of the object lens 12 and the recording surface 4a of the disk 4 is monitored by the angular detector units 16 and 18. If that angle is not 90°, the difference signal (mentioned before) is output from one or both of the detector units 16 and 18. More specifically, outputs of detector units 16 and 18 are added together by amplifiers 34c and 34d, and if the angle between the optical axis and the recording surface 4a is not 90°, the added outputs are produced as the difference signal. As described above, the difference signal is defined as zero where the angle between the optical axis of the object lens 12 and the recording surface of the disk 4 is 90°.

Where the difference signal is output from either amplifier 34c or 34d, it is added by means of adders 42a and 42b to the focus error signal which is supplied from amplifier 34a to the focus control circuit 36. Accordingly, the focusing coils 20a, 20b, 22a and 22b are energized not only by the focus control signal supplied from the focus control circuit 36 but also by the difference signal.

Figure 5A:
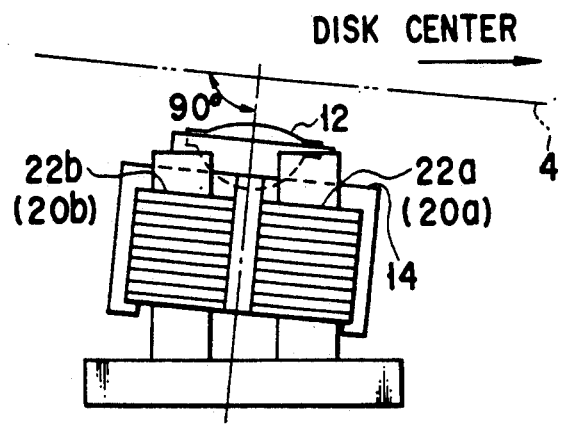
FIGS. 5A-5C are schematic views showing how the object lens is tilted in the radial direction.
Figure 5B:
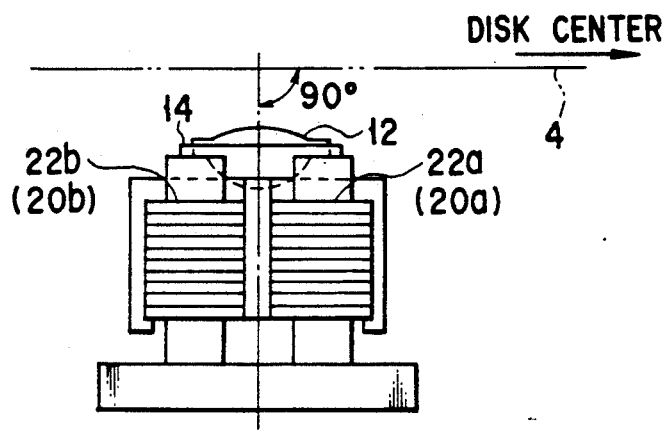
Figure 5C:
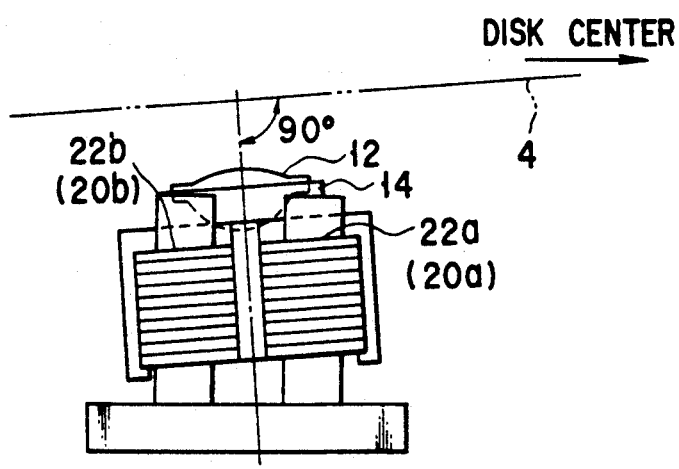

A description will be given with reference to FIGS. 5A–5C as to how the object lens 12 is driven in the radial direction of the disk by the focusing coils 20a, 20b, 22a and 22b. Let it be assumed that the focusing coils are applied with the focus control signal having a predetermined magnitude and polarity. If, in this state, the difference signal of negative polarity is supplied to focusing coils 20a and 22a, and the signal of positive polarity is supplied to focusing coils 20b and 22b, then the object lens 12 (i.e., the lens mount member 14) rises while being inclined toward the center of the disk 4, as is shown in FIG. 5A. (The polarity of the difference signal that causes the object lens 14 to move closer to the disk 4 is determined as "positive" herein.) On the other hand, if the difference signal of positive polarity is supplied to focusing coils 20a and 22a, and the signal of negative polarity is supplied to focusing coils 20b and 22b, then the object lens 12 (i.e., the lens mount member 14) rises while being inclined toward the radially outer region of the disk 4, as is shown in FIG. 5C. Needless to say, FIG. 5B shows the state where the difference signals are zero.

A description will be given with reference to FIGS. 6A–6C as to how the object lens 12 is driven in the tangential direction of the disk by the focusing coils 20a, 20b, 22a and 22b. Let it be assumed that the focusing coils are applied with the focus control signal having a predetermined magnitude and polarity. If, in this state, the difference signal of positive polarity is supplied to focusing coils 20a and 20b, and the signal of negative polarity is supplied to focusing coils 22a and 22b, then the object lens 12 (i.e., the lens mount member 14) rises while being inclined backward with reference to the rotating direction of the disk 4, as is shown in FIG. 6A. On the other hand, if the difference signal of negative polarity is supplied to focusing coils 20a and 20b, and the signal of positive polarity is supplied to focusing coils 22a and 22b, then the object lens 12 (i.e., the lens mount member 14) rises while being inclined forward with reference to the rotating direction of the disk 4, as is shown in FIG. 6C. Like FIG. 5B, FIG. 6B shows the state where the difference signals are zero.

As described above, the focusing coils employed in the present invention enable the object lens to rise or fall while being inclined in accordance with a variation in the angle formed by the recording surface of the disk and the optical axis of the object lens, whereas the focusing coils employed in the related art merely permit the object lens to rise or fall only in the direction perpendicular to the recording surface of the disk.

Even when the object lens is inclined, both focus control and track control can be performed since the currents used for the focus control and track control are kept supplied. Accordingly, quick response speed is ensured with respect to the optical head.

It should be also noted that the present invention is applicable not only to an object lens but also to an optical head wherein an object lens is integrally combined with a mirror (not shown) used for directing a laser beam to the object lens. Needless to say, where the present invention is applied to this type of optical head, the weight of the mirror has to be taken into consideration.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:
1. An optical head apparatus comprising:
   an optical element for focusing a light beam onto a surface of an optical disk;
   means for detecting a first bend of said surface of said optical disk in a radial direction of said optical disk;
   means for detecting a second bend of said surface of said optical disk in a tangential direction of said optical axis;
   means for tilting said optical element in accordance with said first and second bends, said tilting means having at least four coil elements arranged on a plant that is parallel to both said radial and tangen- tial directions of said optical disk and which is perpendicular to said optical axis of said optical element, said at least four coil elements including a first pair of coils for tilting said optical element in said radial direction and a second pair of coils for tilting said optical element in said tangential direction; and means for independently energizing said two pairs of coils in accordance with said detection results of said first and second detecting means.

2. An optical head apparatus according to claim 1, wherein said coils are energized independently of one another and drive the optical element such that the optical axis and the surface of the optical disk form an angle of 90°.

3. An optical head apparatus according to claim 2, wherein the coils are paired off symmetrically to a first plane containing the optical axis and perpendicular to a radial direction.

4. An optical head apparatus according to claim 3, wherein the coils are paired off symmetrically to a second plane perpendicular to the first plane.

5. An optical head apparatus according to claim 1, wherein said coils are energized by currents having a predetermined magnitude and polarity.

6. A system for reproducing information recorded on an optical disk, comprising:

a light source for generating a light beam;

an optical element, having an optical axis, for focusing the light beam generated by the light source onto a recording tract formed on a recording surface of the optical disk;

means for holding said optical element, said holding means including a plurality of coil elements which are arranged on a plane perpendicular to the optical axis, said coil elements being capable of producing a propelling force in a direction which is parallel to a plane containing the optical axis so as to tilt said optical element in a radial direction and to tilt said optical element in a tangential direction;

means for supporting the holding means such that the holding means is movable in a desirable direction;

means for energizing the coil elements of the holding means;

means for detecting whether the recording surface and the optical axis form an angle of 90° in both said radial and said tangential direction of the recording surface; and means, actuated when the angle detected by the detecting means is other than 90°, for controlling the energizing means so as to maintain the angle between the recording surface and the optical axis at 90°.

7. A system according to claim 6, wherein said coil elements include two pairs of coils which are paired off in one of a first direction and second direction perpendicular to the first direction, are energized independently of one another, and drive the holding means along the optical axis such that the optical axis and the recording surface form an angle of 90°.

8. A system according to claim 7, wherein the coils are paired off symmetrically to a first direction to a first plane containing the optical axis, and perpendicular to a radial direction.

9. A system according to claim 8, wherein the coils are paired off symmetrically to a second plane perpendicular to the first plane.

* * * * *